(12) United States Patent
Taylor

(10) Patent No.: US 7,261,356 B1
(45) Date of Patent: Aug. 28, 2007

(54) TRAILER

(76) Inventor: Ricky Taylor, 18708 Primrose La., Buckey, AZ (US) 85326

( * ) Notice: Subject to any disclaimer, the term of this patent is extended or adjusted under 35 U.S.C. 154(b) by 393 days.

(21) Appl. No.: 10/966,553

(22) Filed: Oct. 15, 2004

(51) Int. Cl.
*B62D 33/03* (2006.01)

(52) U.S. Cl. ................ 296/61; 296/146.8; 296/146.11; 49/386

(58) Field of Classification Search ................. 296/51, 296/57.1, 61, 146.8, 146.11; 49/386; 414/537, 414/480, 534
See application file for complete search history.

(56) References Cited

U.S. PATENT DOCUMENTS

| | | | | | |
|---|---|---|---|---|---|
| 907,768 | A | * | 12/1908 | Fromhart | ...................... 16/347 |
| 2,990,212 | A | * | 6/1961 | Nicastro | ...................... 293/34 |
| 3,461,607 | A | * | 8/1969 | Anderton et al. | ................ 49/7 |
| 3,536,214 | A | * | 10/1970 | Sorg et al. | .................. 414/537 |
| 4,657,233 | A | * | 4/1987 | Vroom | ....................... 267/155 |
| 4,691,956 | A | * | 9/1987 | Hodge | .......................... 296/51 |
| 5,533,234 | A | * | 7/1996 | Bizek | ........................... 16/308 |
| 5,937,583 | A | * | 8/1999 | Lamperti | ..................... 49/386 |
| 6,964,445 | B1 | * | 11/2005 | Bellis, Jr. | ................... 296/57.1 |
| 6,976,723 | B2 | * | 12/2005 | Libby | .......................... 296/50 |
| 7,036,863 | B2 | * | 5/2006 | Hunter | ........................ 296/61 |
| 2002/0070576 | A1 | * | 6/2002 | Rayburn | ...................... 296/61 |
| 2006/0028048 | A1 | * | 2/2006 | Brenneman et al. | ..... 296/146.8 |
| 2006/0220410 | A1 | * | 10/2006 | Luehr et al. | .................. 296/61 |

* cited by examiner

*Primary Examiner*—Jason S Morrow
(74) *Attorney, Agent, or Firm*—Parsons & Goltry; Michael W. Goltry; Robert A. Parsons

(57) ABSTRACT

A trailer includes a ramp having an end attached to the trailer for pivotal movement of the ramp between a raised gate position and a lowered, inclined loading position. An elongate support is attached to the trailer adjacent to the end of the ramp, and a tension spring encircles the support and has a first tag end coupled to the end of the ramp and a second tag end coupled to the trailer and winding and unwinding in response to movement of ramp between the raised gate position and the lowered, inclined loading position, respectively.

22 Claims, 8 Drawing Sheets

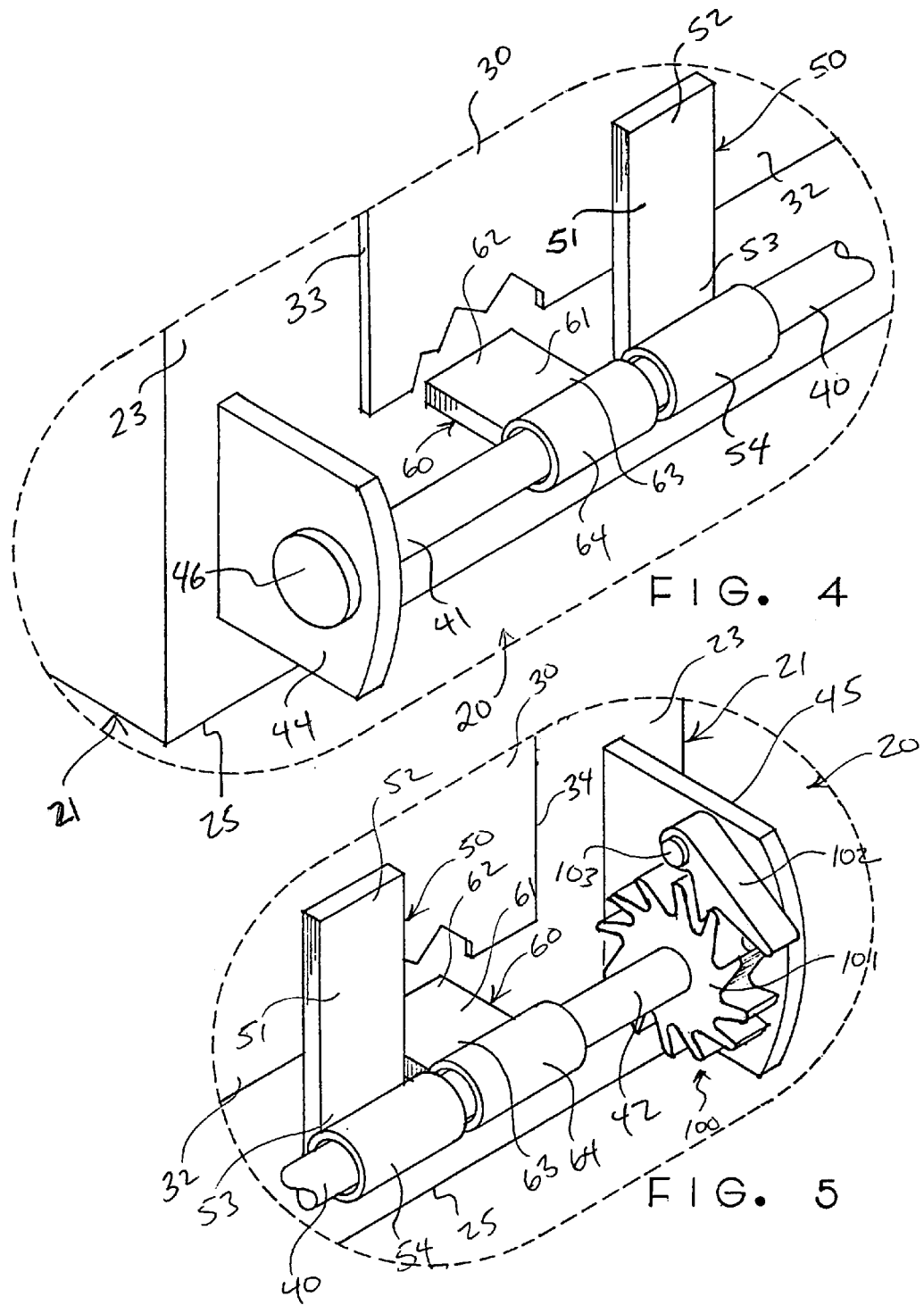

TRAILER

BACKGROUND OF THE INVENTION

1. Field of the Invention

The present invention relates to trailers having pivotally attached ramps, and to governors for taking up the load of pivotally attached ramps.

2. Related Art and Prior Art Statement

It is known to provide a trailer for transporting objects such as small vehicles and equipment wherein the trailer has a ramp pivotally mounted for movement between a lowered, inclined loading position and a raised gate position enclosing an entrance to a storage area of the trailer. However, the ramps of such prior art trailers can be quite heavy and difficult and dangerous to move. Although many such prior art trailers incorporate assemblies for taking up at least a portion of the load of the ramps that make moving the ramps more manageable, such prior art assemblies are difficult to construct, expensive, and obstruct the entrances to the storage areas, especially from the sides of the ramps. Given these and other deficiencies in the art, the need for certain new and useful improvements is evident.

SUMMARY OF THE INVENTION

It is an object of the invention to provide a trailer with a pivotally attached ramp that is movable between a raised gate position and a lowered, inclined loading position which is simple in structure, which is low in cost, which is safe, in which there is a governing assembly that takes up the load of the ramp for allowing it to be easily moved between its raised gate position and its lowered, inclined loading position.

According to the invention, there is provided a trailer, a ramp including an end attached to the trailer for pivotal movement of the ramp between a raised gate position and a lowered, inclined loading position, an elongate support attached to the wheeled body adjacent to the end of the ramp, and a tension spring encircling the support and having a first tag end coupled to the end of the ramp and a second tag end coupled to the trailer and winding and unwinding in response to movement of ramp between its raised gate position and its lowered, inclined loading position, respectively. The tension spring applies a working stress or force against the trailer and the ramp. The first tag end is disposed in a first fixture, for relative reciprocal movement, affixed to the end of the ramp, and the second tag end disposed in a second fixture, for relative reciprocal movement, affixed to the trailer. To adjust the working stress applied by the tension spring, one of the first and second fixtures is adjustable between a first position away from one of the trailer and the end of the ramp and a second position toward the one of the trailer and the end of the ramp.

In a trailer, and a ramp having an end attached to the trailer for pivotal movement of the ramp between a raised gate position and a lowered, inclined loading position, improvements therein in accordance with the invention include an elongate support attached to the trailer adjacent to the end of the ramp, and a tension spring encircling the support and having a first tag end coupled to the end of the ramp and a second tag end coupled to the trailer and winding and unwinding in response to movement of ramp between its raised gate position and its lowered, inclined loading position, respectively. The tension spring applies a working stress or force against the trailer and the ramp. The first tag end is disposed in a first sleeve, for relative reciprocal movement, affixed to the end of the ramp, and the second tag end is disposed in a second sleeve, for relative reciprocal movement, affixed to the trailer. To adjust the working stress applied by the tension spring, one of the first and second sleeves is adjustable between a first position away from one of the trailer and the end of the ramp and a second position toward the one of the trailer and the end of the ramp.

According to the invention, there is provided a trailer, a ramp including an end affixed to an elongate support attached to the trailer for rotation in a first direction corresponding to movement of the ramp from a raised gate position and a lowered, inclined loading position, and a second position corresponding to movement of the ramp from the lowered, inclined loading position to the raised gate position, a tension spring encircling the elongate support and having a first tag end coupled to the end of the ramp and a second tag end coupled to the trailer and winding and unwinding in response to movement of ramp between its raised gate position and its lowered, inclined loading position, respectively, a pinion encircling, and rigidly affixed to, the elongate support, and a pawl, affixed to the trailer, and movable between a first position interacting with the pinion preventing the elongate support from rotating in the second direction, and a second position free of the pinion permitting the elongate support to rotate in the second direction. The tension spring applies a working stress or force against the trailer and the ramp. The first tag end disposed in a first sleeve, for relative reciprocal movement, affixed to the end of the ramp, and the second tag end is disposed in a second sleeve, for relative reciprocal movement, affixed to the trailer. To adjust the working stress applied by the tension spring, one of the first and second sleeves is adjustable between a first position away from one of the trailer and the end of the ramp and a second position toward the one of the trailer and the end of the ramp.

In a trailer, and a ramp including an end affixed to an elongate support attached to the trailer for rotation in a first direction corresponding to movement of the ramp from a raised gate position and a lowered, inclined loading position, and a second position corresponding to movement of the ramp from the lowered, inclined loading position to the raised gate position, improvements therein in accordance with the invention including a tension spring encircling the elongate support and having a first tag end coupled to the end of the ramp and a second tag end coupled to the trailer and winding and unwinding in response to movement of ramp between its raised gate position and its lowered, inclined loading position, respectively, a pinion encircling, and rigidly affixed to, the elongate support, and a pawl, affixed to the trailer, and movable between a first position interacting with the pinion preventing the elongate support from rotating in the second direction, and a second position free of the pinion permitting the elongate support to rotate in the second direction. The tension spring applies a working stress or force against the trailer and the ramp. The first tag end is disposed in a first sleeve, for relative reciprocal movement, affixed to the end of the ramp, and the second tag end is disposed in a second sleeve, for relative reciprocal movement, affixed to the trailer. To adjust the working stress applied by the tension spring, one of the first and second sleeves is adjustable between a first position away from one of the trailer and the end of the ramp and a second position toward the one of the trailer and the end of the ramp.

According to the invention, there is provided a trailer, a ramp including an end attached to the trailer for pivotal movement of the ramp between a raised gate position and a lowered, inclined loading position, an elongate support attached to the trailer adjacent to the end of the ramp, a plurality of tension springs attached to the elongate support at spaced intervals, and each of the tension springs encircling the support and having a first tag end coupled to the end of the ramp and a second tag end coupled to the trailer and winding and unwinding in response to movement of ramp between its raised gate position and its lowered, inclined loading position. The tension springs each apply a working stress or force against the trailer and the ramp. The first tag ends are each disposed in one of a plurality of first sleeves, for relative reciprocal movement, affixed to the end of the ramp, and the second tag ends are each disposed in one of a plurality of second sleeves, for relative reciprocal movement, affixed to the trailer. To adjust the working stresses of the tension springs, wherein one of the first sleeves and the second sleeves are each adjustable between a first position away from one of the trailer and the end of the ramp and a second position toward the one of the trailer and the end of the ramp.

In a trailer, and a ramp having an end attached to the trailer for pivotal movement of the ramp between a raised gate position and a lowered, inclined loading position, improvements therein in accordance with the invention include an elongate support attached to the trailer adjacent to the end of the ramp, a plurality of tension springs attached to the elongate support at spaced intervals, and each of the tension springs encircling the support and having a first tag end coupled to the end of the ramp and a second tag end coupled to the trailer and winding and unwinding in response to movement of ramp between its raised gate position and its lowered, inclined loading position, respectively. The tension springs each apply a working stress or force against the trailer and the ramp. The first tag ends are each disposed in one of a plurality of first sleeves, for relative reciprocal movement, affixed to the end of the ramp, and the second tag ends are each disposed in one of a plurality of second sleeves, for relative reciprocal movement, affixed to the trailer. To adjust the working stresses of the tension springs, one of the first sleeves and the second sleeves are each adjustable between a first position away from one of the trailer and the end of the ramp and a second position toward the one of the trailer and the end of the ramp.

According to the invention, there is provided a trailer, a ramp including an end affixed to an elongate support attached to the trailer for rotation in a first direction corresponding to movement of the ramp from a raised gate position and a lowered, inclined loading position, and a second position corresponding to movement of the ramp from the lowered, inclined loading position to the raised gate position, a plurality of tension springs each encircling the support and having a first tag end coupled to the end of the ramp and a second tag end coupled to the trailer and winding and unwinding in response to movement of ramp between its raised gate position and its lowered, inclined loading position, respectively, a pinion encircling, and rigidly affixed to, the elongate support, and a pawl, affixed to the trailer, and movable between a first position interacting with the pinion preventing the elongate support from rotating in the second direction, and a second position free of the pinion permitting the elongate support to rotate in the second direction. The tension springs each apply a working stress or force against the trailer and the ramp. The first tag ends are each disposed in one of a plurality of first sleeves, for relative reciprocal movement, affixed to the end of the ramp, and the second tag ends are each disposed in one of a plurality of second sleeves, for relative reciprocal movement, affixed to the trailer. To adjust the working stresses of the tension springs, wherein one of the first sleeves and the second sleeves are each adjustable between a first position away from one of the trailer and the end of the ramp and a second position toward the one of the trailer and the end of the ramp.

In a trailer, and a ramp including an end affixed to an elongate support attached to the trailer for rotation in a first direction corresponding to movement of the ramp from a raised gate position and a lowered, inclined loading position, and a second position corresponding to movement of the ramp from the lowered, inclined loading position to the raised gate position, improvements therein in accordance with the invention including a plurality of tension springs each encircling the support and having a first tag end coupled to the end of the ramp and a second tag end coupled to the trailer and winding and unwinding in response to movement of ramp between its raised gate position and its lowered, inclined loading position, respectively, a pinion encircling, and rigidly affixed to, the elongate support, and a pawl, affixed to the trailer, and movable between a first position interacting with the pinion preventing the elongate support from rotating in the second direction, and a second position free of the pinion permitting the elongate support to rotate in the second direction. The tension springs each apply a working stress or force against the trailer and the ramp. The first tag ends are each disposed in one of a plurality of first sleeves, for relative reciprocal movement, affixed to the end of the ramp, and the second tag ends are each disposed in one of a plurality of second sleeves, for relative reciprocal movement, affixed to the trailer. To adjust the working stresses applied by the tension springs, one of the first sleeves and the second sleeves are each adjustable between a first position away from one of the trailer and the end of the ramp and a second position toward the one of the trailer and the end of the ramp.

According to the invention, there is provided a trailer, a ramp including an end attached to the trailer for pivotal movement of the ramp between a raised gate position and a lowered, inclined loading position, an elongate support attached to the trailer adjacent to the end of the ramp, a plurality of tension springs attached to the elongate support at spaced intervals, and each of the tension springs encircling the support and having a first tag end disposed a first sleeve, for relative reciprocal movement, affixed to the end of the ramp, and a second tag end disposed in second sleeve, for relative reciprocal movement, affixed to the trailer, and winding and unwinding in response to movement of ramp between its lowered and raised positions, respectively. The tension springs each apply a working stress or force against the trailer and the ramp. With respect to each of the tension springs, to adjust the working stress applied thereby one of the first sleeve and the second sleeve is adjustable between a first position away from one of the trailer and the end of the ramp and a second position toward the one of the trailer and the end of the ramp.

In a trailer, and a ramp including an end attached to the trailer for pivotal movement of the ramp between a raised gate position and a lowered, inclined loading position, improvements therein in accordance with the invention including an elongate support attached to the trailer adjacent to the end of the ramp, a plurality of tension springs attached to the elongate support at spaced intervals, and each of the tension springs encircling the support and having a first tag end disposed a first sleeve, for relative reciprocal movement, affixed to the end of the ramp, and a second tag end disposed in second sleeve, for relative reciprocal movement, affixed to the trailer, and winding and unwinding in response to movement of ramp between its raised gate position and its lowered, inclined loading position, respectively. The tension springs each apply a working stress or force against the trailer and the ramp. With respect to each of the tension springs, to adjust the working stress applied thereby one of the first sleeve and the second sleeve is adjustable between a first position away from one of the trailer and the end of the ramp and a second position toward the one of the trailer and the end of the ramp.

According to the invention, there is provided a trailer, a ramp including an end affixed to an elongate support attached to the trailer for rotation in a first direction corresponding to movement of the ramp from a raised gate position and a lowered, inclined loading position, and a second position corresponding to movement of the ramp from the lowered, inclined loading position to the raised gate position, a plurality of tension springs each encircling the support and having a first tag end disposed a first sleeve, for relative reciprocal movement, affixed to the end of the ramp, and a second tag end disposed in second sleeve, for relative reciprocal movement, affixed to the trailer, and winding and unwinding in response to movement of ramp between its raised gate position and its lowered, inclined loading position, respectively, a pinion encircling, and rigidly affixed to, the elongate support, and a pawl, affixed to the trailer, and movable between a first position interacting with the pinion preventing the elongate support from rotating in the second direction, and a second position free of the pinion permitting the elongate support to rotate in the second direction. The tension springs each apply a working stress or force against the trailer and the ramp. With respect to each of the tension springs, to adjust the working stress applied thereby one of the first sleeve and the second sleeve is adjustable between a first position away from one of the trailer and the end of the ramp and a second position toward the one of the trailer and the end of the ramp.

In a trailer, and a ramp including an end affixed to an elongate support attached to the trailer for rotation in a first direction corresponding to movement of the ramp from a raised gate position and a lowered, inclined loading position, and a second position corresponding to movement of the ramp from the lowered, inclined loading position to the raised gate position, improvements therein in accordance with the invention including a plurality of tension springs each encircling the support and having a first tag end disposed a first sleeve, for relative reciprocal movement, affixed to the end of the ramp, and a second tag end disposed in second sleeve, for relative reciprocal movement, affixed to the trailer, and winding and unwinding in response to movement of ramp between its raised gate position and its lowered, inclined loading position, respectively, a pinion encircling, and rigidly affixed to, the elongate support, and a pawl, affixed to the trailer, and movable between a first position interacting with the pinion preventing the elongate support from rotating in the second direction, and a second position free of the pinion permitting the elongate support to rotate in the second direction. The tension springs each apply a working stress or force against the trailer and the ramp. With respect to each of the tension springs, to adjust the working stress applied thereby one of the first sleeve and the second sleeve is adjustable between a first position away from one of the trailer and the end of the ramp and a second position toward the one of the trailer and the end of the ramp.

Consistent with the foregoing summary of preferred embodiments, and the ensuing detailed description, which are to be taken together, the invention also contemplates associated apparatus and method embodiments.

BRIEF DESCRIPTION OF THE DRAWINGS

Referring to the drawings:

FIG. 4 is an enlarged, fragmented, isometric view of subject matter in the dotted reference bubble denoted at 4 in FIG. 2 illustrating an attachment of the end of the ramp to the elongate support;

FIG. 5 is an enlarged, fragmented, isometric view of subject matter in the dotted reference bubble denoted at 5 in FIG. 2 illustrating a ratchet assembly associated with the elongate support;

DETAILED DESCRIPTION OF PREFERRED EMBODIMENTS

Figure 1:
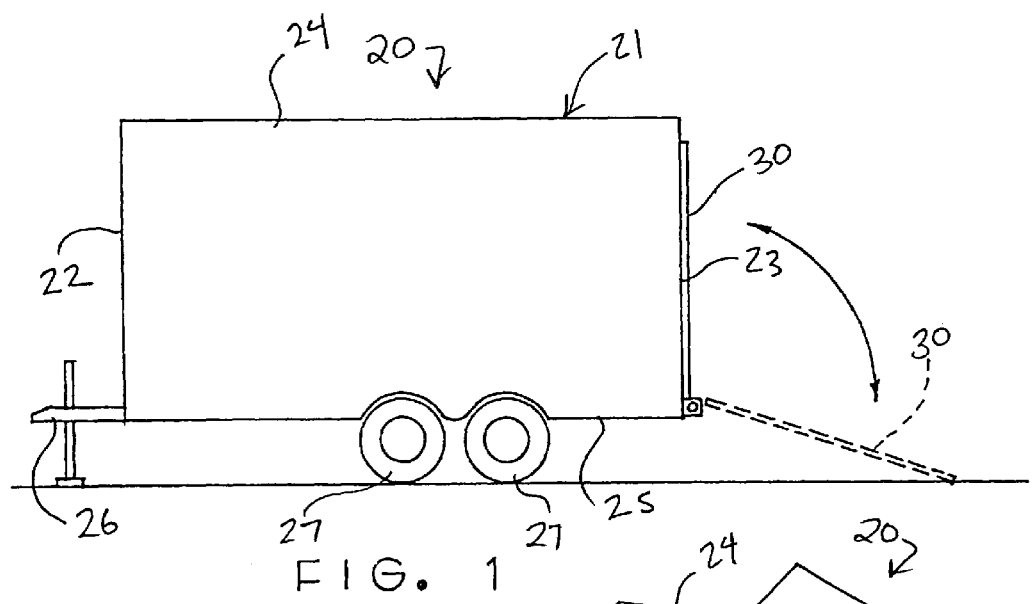
FIG. 1 is side elevational view of a trailer including a pivotally attached ramp movable between a raised gate position and a lowered, inclined loading position, the trailer constructed and arranged in accordance with the principle of the invention.

Turning now to the drawings, in which like reference characters indicate corresponding elements throughout the several views, attention is first directed to FIG. 1 in which there is seen a trailer 20 including a wheeled vehicle body 21, enclosing a storage area, having opposing upstream and downstream ends 22 and 23, opposing upper and lower ends 24 and 25, and a hitch assembly 26, for lifting and towing and for connecting trailer 20 to a motor vehicle such as an automobile (not shown), attached to and projecting forwardly of upstream end 22. Body 21 typically includes of a frame (not shown) made of strong metal, such as steel or aluminum, and is furnished with one or more attached axles to which wheels 27 are attached in a conventional manner for permitting its wheeled movement. In the immediate embodiment, trailer 20 incorporates four wheels 27, two on each side, and less or more can be used depending on specific user requirements. Paneling, considered part of body 21, such as wood paneling, plastic paneling, aluminum paneling, fiberglass paneling, or the like, is attached to the frame of trailer 20 and encloses the storage area. An entrance (not shown) to the storage area is located at downstream end 23 of trailer 20. A ramp 30 is attached to downstream end 22 of body 21 for pivotal movement between a raised gate position, enclosing the entrance to the storage area, and a lowered, inclined loading position as depicted in phantom outline in FIG. 1, opening the entrance and for loading and unloading to and from the storage area through the entrance.

Figure 2:
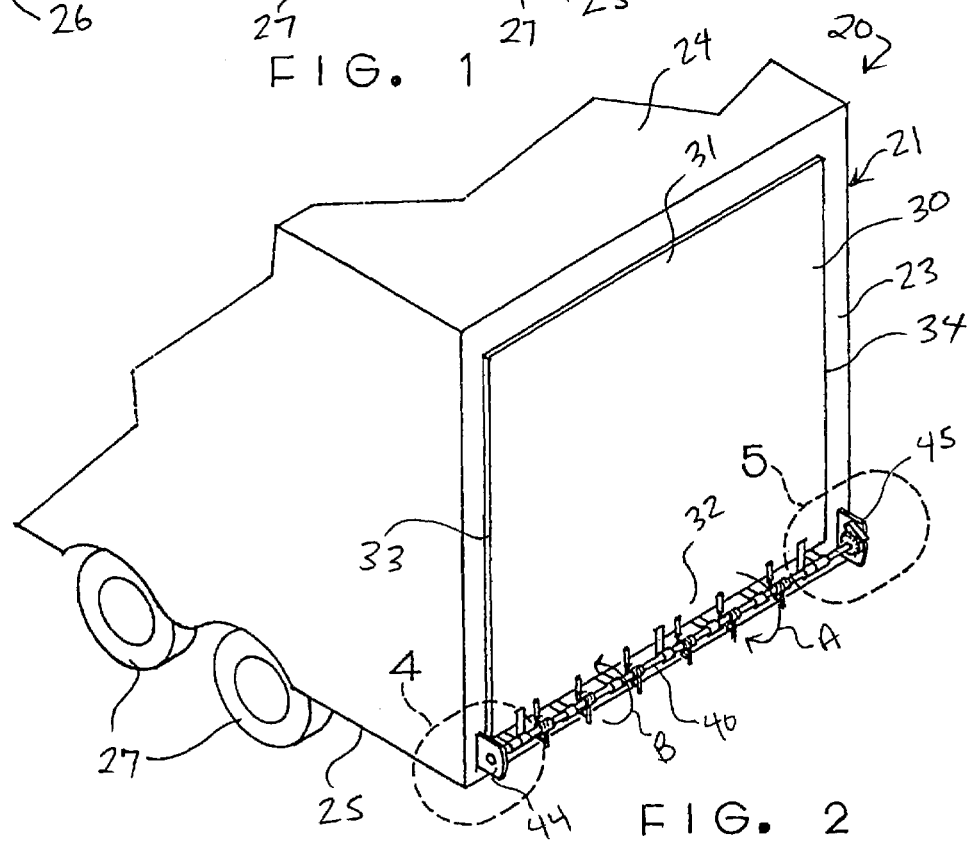
FIG. 2 is a fragmented rear isometric view of the trailer of FIG. 1 illustrating the ramp, and a governing assembly including an elongate support and tension spring assemblies each including a tension spring encircling the elongate support and having a tag end coupled to an end of the ramp and another tag end coupled to a trailer, and winding and unwinding in response to movement of the ramp between its raised gate position and its lowered, inclined loading position.
Figure 3:
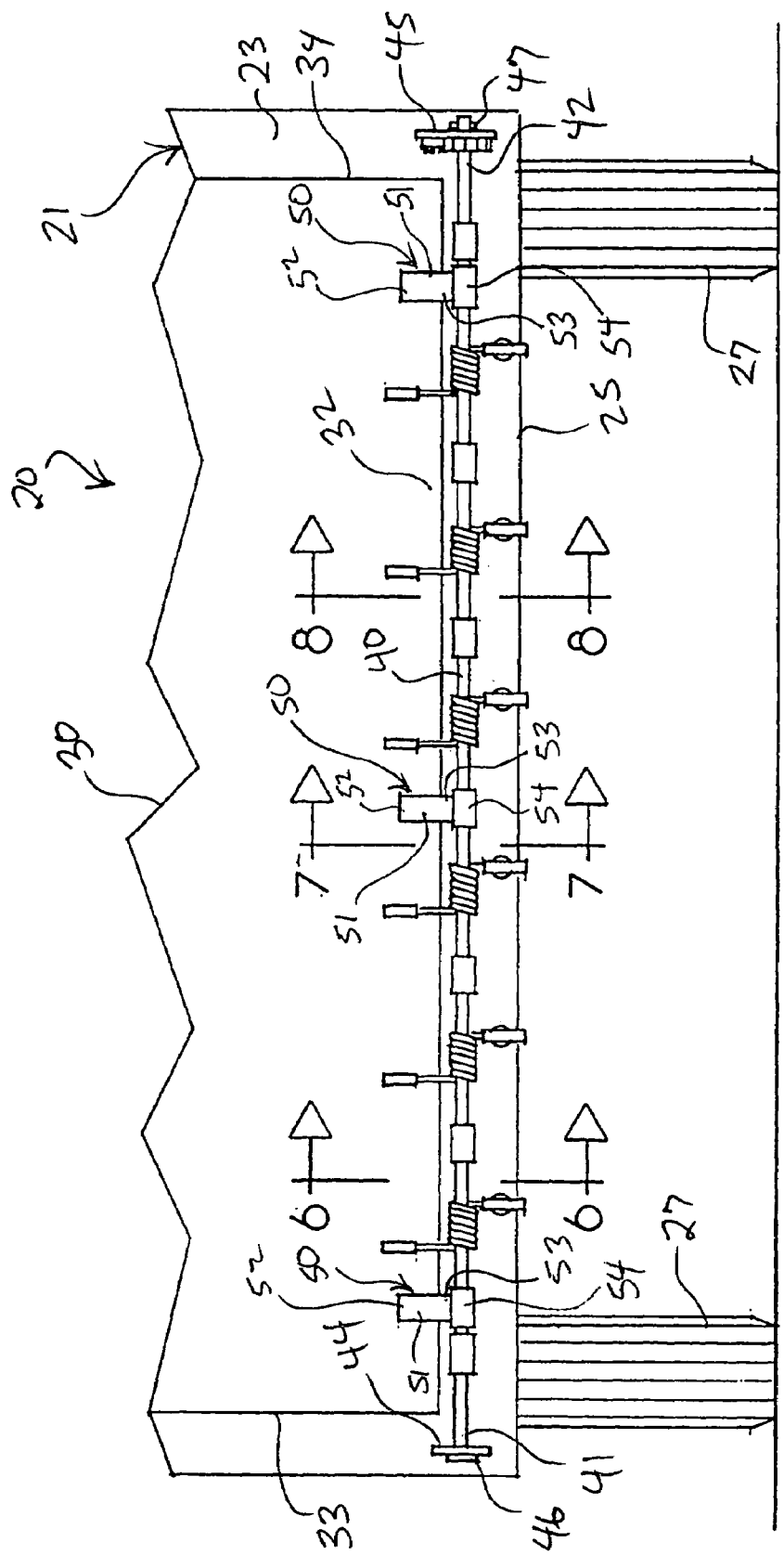
FIG. 3 is an enlarged, fragmented, rear elevational view of the trailer of FIG. 2.

Referring to FIG. 2, ramp 30 consists of a large, flat, rigid panel having opposing upper and lower ends 31 and 32, opposing sides 33 and 34, and opposing inner and outer faces. Referring also to FIG. 3, lower end 32 is affixed to a support 40, which is located outboard of the outer face of ramp 30. Support 40 is an elongate, rigid, cylindrical rod, having opposing ends 41 and 42, fashioned preferably of steel, aluminum, or other rigid, strong material or combination of materials. Support 40 is situated at lower end 25 of body 21, as shown in FIGS. 2 and 3, beneath, and substantially parallel to, lower end 32 of ramp 30. Support 40 extends across downstream end 23 of trailer 20 along the entire width of lower end 32 of ramp 30, and is supported outboard of downstream end 23 of body 21 of trailer 20. Support 40 is actually somewhat longer than the width of lower end 32 of ramp 30, in which end 41 projects laterally outboard of side 33 and end 42 projects laterally outboard of side 34.

Ends 41 and 42, as best seen in FIG. 3, are attached to and held by brackets 44 and 45, respectively, rigidly affixed to downstream end 23 of body 21 at lower end 25 at either side of body 21. Brackets 44 and 45 are preferably welded in place, but they can be rigidly affixed in place in other ways in accordance with the skill attributed to the skilled artisan. Support 40 is mounted for rotation to brackets 44 and 45. In this specific embodiment, ends 41 and 42 extend through openings through brackets 44 and 45, and are free to rotate therein. A flange 46 affixed to end 41 outboard of bracket 41 and a pin 46 affixed to end 42 outboard of bracket 45 retain support 40 in place and prevent it from dislodging from brackets 44 and 45, and this arrangement can be reversed, if desired. Brackets 44 and 45 are considered part of trailer 20.

Lower end 32 of ramp 30 is affixed to support 40 with brackets 50. Brackets 50 are located at spaced intervals along lower end 32 of ramp 30 between sides 33 and 34. In the immediate embodiment, three such brackets 50 are used for affixing lower end 32 of ramp 30 to support 40, and less or more can be used depending on specific needs and applications or as otherwise may be required. Brackets 50 are identical to one another, and the structural details of only one will be presently described with the understanding the ensuing discussion applies to all brackets 50.

Figure 7:
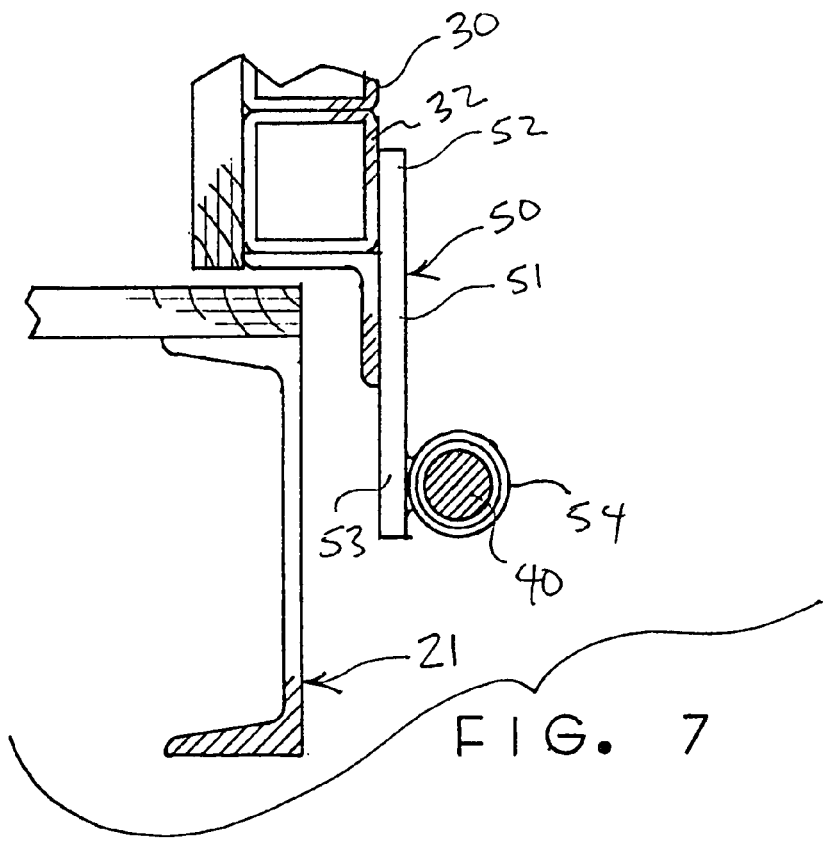
FIG. 7 is a sectional view taken along line 7-7 of FIG. 3.

Referring to FIG. 4, a bracket 50 is shown which is fashioned of steel or aluminum or other rigid material or combination of materials, and which consists of an elongate element 51 having a proximal end 52 rigidly affixed to lower end 32 of ramp 30, an opposing distal end 53 extending downwardly and outboard of lower end 32, and a collar 54 rigidly affixed to distal end 53 and to support 40. Collar 54 encircles support 40, and fits tightly thereabout being rigidly affixed thereto. In FIG. 4, a significant space is shown between collar 54 and support 40, and it is to be understood that this depiction is only for illustrative purposes. Collar 54 can be welded to distal end 53 or affixed with one or more screws, rivets, or other fastening structure providing a rigid attachment. Collar 54 and elongate element 51 can be integrally fashioned, if desired. If desired, collar 54 can be welded to support 40, or secured to support 40 with one or more screws, pins, or other fastening structure providing a rigid attachment. As a matter of perspective, FIG. 7 is a sectional view taken along line 7-7 of FIG. 3 illustrating a bracket 50 and its attachment to ramp 30 and support 40, including elongate element 51 and its proximal and distal ends 52 and 53, collar 54, and support 40 extending through collar 54.

Support 40 is the pivotal attachment point of ramp 30 to trailer 20. It is to be understood, therefore, that support 40 rotates relative to brackets 44 and 45 in a first direction indicated by the arcuate arrowed line A in FIG. 2 which corresponds to movement of ramp 30 from its raised gate position to its lowered, inclined loading position, and a second direction indicated by the arcuate arrowed line B in FIG. 2 which corresponds to movement of ramp 30 from its lowered, inclined loading position to its raised gate position. In order to help ramp 30 stay in its lowered, inclined loading position and prevent it from being inadvertently dislodged therefrom, the invention incorporates a ratchet assembly 100, which will be discussed later in this specification.

Additional support for support 40, as best seen in FIG. 3, is provided by a series of support brackets 60. Support brackets 60 are attached to downstream end 23 of body 21 opposite support 40, and are arranged at spaced intervals along lower end 32 between brackets 44 and 45. In the immediate embodiment, six such support brackets 60 are employed for providing additional support points for support 40, and less or more can be used depending on specific needs and applications. Support brackets 60 are identical to one another, and the structural details of only one will be immediately described with the understanding the ensuing discussion applies to all support brackets 60.

Figure 6:
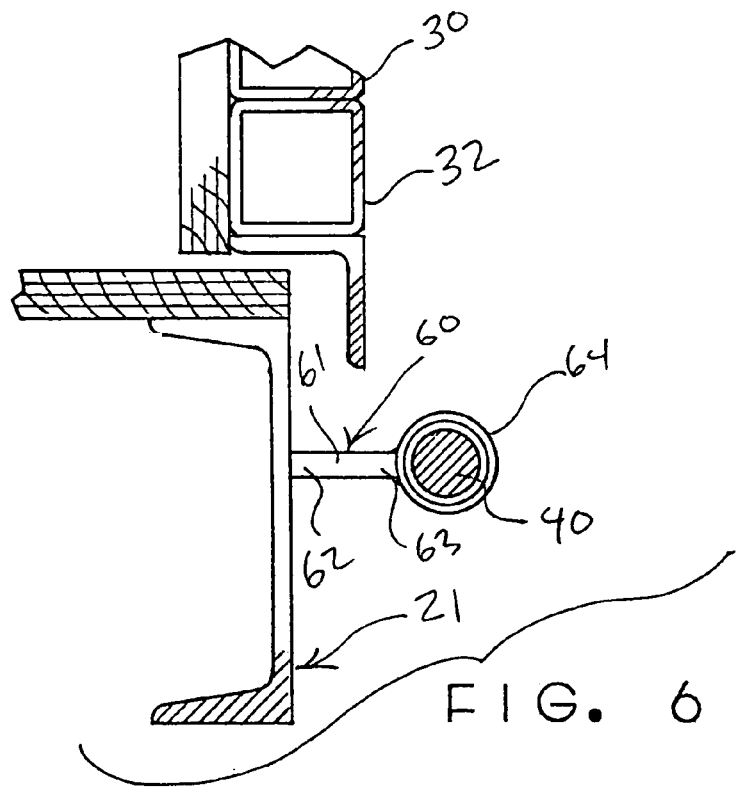
FIG. 6 is a sectional view taken along line 6-6 of FIG. 3.

Referring to FIG. 4, a bracket 60 is shown which is fashioned of steel or aluminum or the like and which consists of an elongate element 61 having a proximal end 62 rigidly affixed to downstream end 23 of body 21 at lower end 25, an opposing distal end 63 extending outboard, or otherwise rearwardly of, downstream end 23, and a collar 64 rigidly affixed to distal end 63 in the same manner as previously described in connection with collar 54 and distal end 53. Collar 64 encircles support 40, and support 40 is free to rotate therein. As a matter of perspective, FIG. 6 is a sectional view taken along line 6-6 of FIG. 3 illustrating a bracket 60 and its attachment to body 21 and support 40, including elongate element 61 and its proximal and distal ends 62 and 63, collar 64, and support 40 extending through collar 64.

A plurality of tension springs 80, as best seen in FIG. 3, are attached to support 40 at spaced intervals along the length thereof between brackets 44 and 45 and ends 41 and 42 of support 40 and, moreover, between sides 33 and 34 of ramp 30. Tension springs 80 interact with ramp 30 and body 21 and support 40, and together take up the load, partially or in its entirety, of ramp 30 for allowing ramp 30 to be easily moved between its raised gate position and its lowered, inclined loading position without being encumbered by the load of ramp 30, tension springs 80 winding in response to movement of the ramp 30 from its raised gate position and its lowered, inclined loading position and unwinding in response to movement of ramp 30 from its lowered, inclined loading position to its raised gate position. In the immediate embodiment, six such tension springs 80 are employed, and less or more can be used depending on specific needs and applications, including even just a single tension spring. Tension springs 80 are identical to one another, and the structural details of only one will be immediately described with the understanding the ensuing discussion applies to all tension springs 80.

Figure 10:
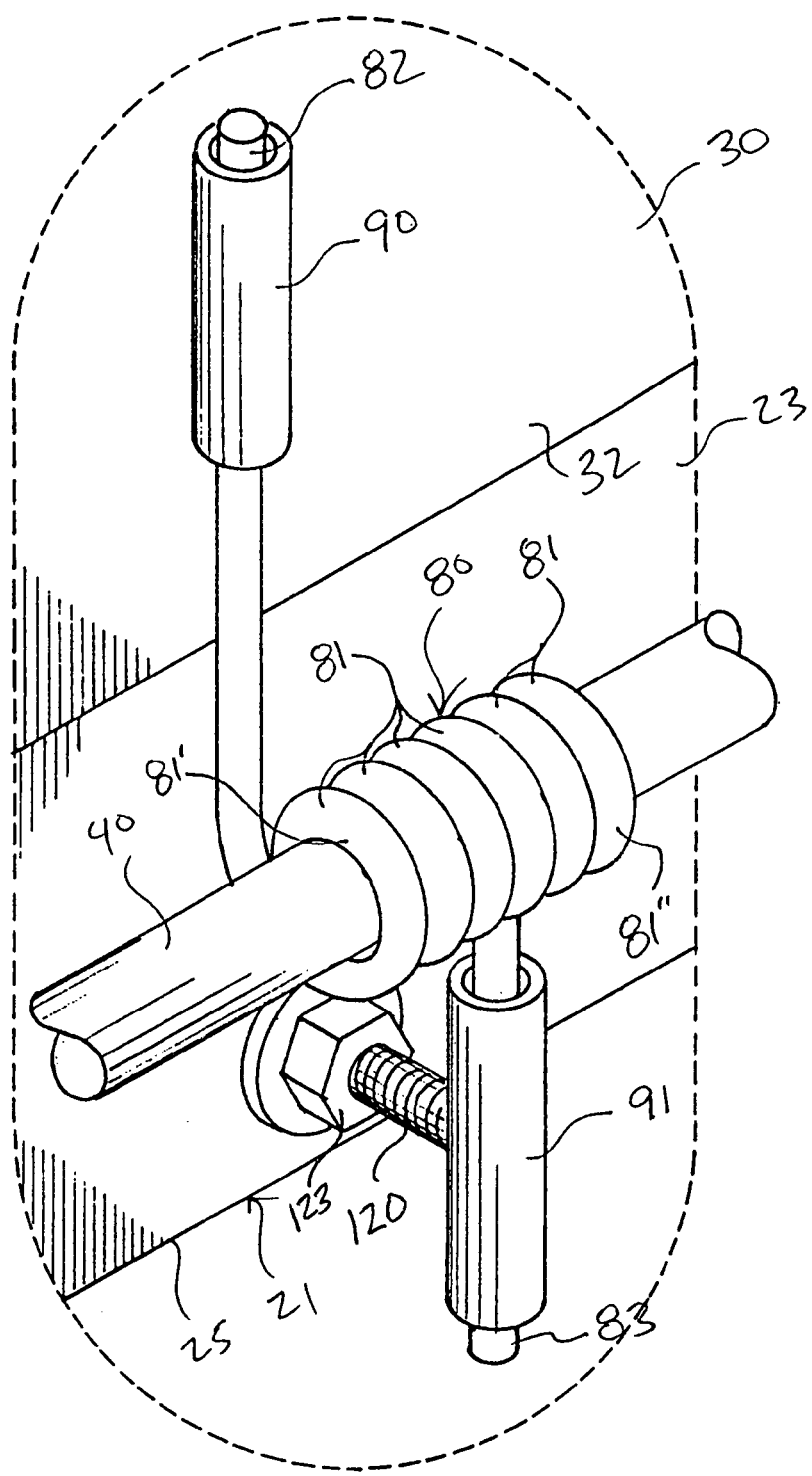
FIG. 10 is an enlarged isometric view of one of the tension spring assemblies of the governor assembly of FIG. 2 shown as it would appear attached to the elongate support and mounted in place.

Referring to FIG. 10, a tension spring 80 is shown which includes a wire formed into coils 81 encircling support 40, in which support 40 is able to rotate therein coils 81. In this specific embodiment, tension spring 80 has six active coils 81, in which the two opposing outermost coils 81' and 81" lead to tag ends 82 and 83, respectively, although less or more active coils 81 may be employed. Tag end 82 is secured to lower end 32 of ramp 30 and tag end 83 is secured to body 21 beneath lower end 32 of ramp 30. Tension spring 80 is fashioned of spring steel, a nickel-based spring alloy, or other material or combination of materials having a substantially constant moduli of elasticity as is typical with tension springs.

Figure 8:
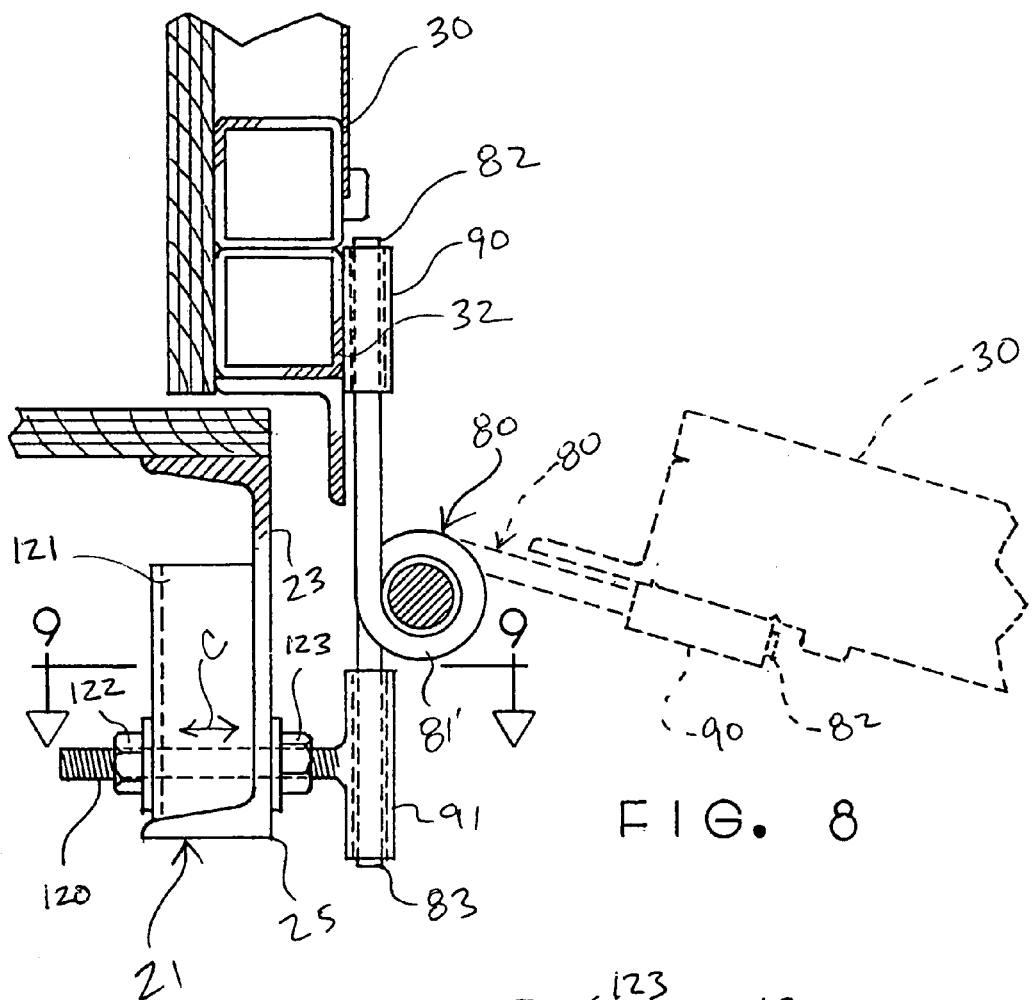
FIG. 8 is a sectional view taken along line 8-8 of FIG. 3.

With continuing reference to FIG. 10 and additional regard to FIG. 8, tag ends 82 and 83 are held by attached fixtures. In the preferred embodiment, tag end 82 is disposed in and held by a fixture consisting of a sleeve 90, and tag end 83 is disposed in and held by a fixture consisting of a sleeve 91. Tag ends 82 and 83 are mounted for relative reciprocal movement through sleeves 90 and 91, respectively. Sleeve 90 is affixed to lower end 32 of ramp 30, and sleeve 91 is affixed to downstream end 23 of body at lower end 25. Sleeves 90 and 91, which are each an elongate cylindrical sidewall having opposing open ends, are secured with welding, with one or more screws, rivets, or other fastening structure providing a rigid attachment. Sleeves 90 and 91 are fashioned of steel or the like, and are elongate. Sleeve 90 holds tag end 83 in place, and yet tag end 83 is free to move and reciprocate therethrough as previously intimated. Sleeve 91 holds tag end 84 in place, and yet tag end 84 is free to move and reciprocate therethrough as previously intimated.

Tension spring 80 applies a forcible impulse against ramp 30 and body 21 at tag ends 82 and 83 and, as best seen in FIG. 8, winds relative to support 40 in response to movement of ramp 30 from its raised gate position to its lowered, inclined loading position, and unwinds relative to support 40 in response to movement of ramp 30 from its lowered, inclined loading position to its raised gate position. As tension spring 80 winds relative to support 40 in response to movement of ramp 30 from its raised gate position to its lowered, inclined loading position, tag ends 82 and 83 are partially taken up and wound about support 40 and become shortened. As tension spring 80 unwinds relative to support 40 in response to movement of ramp 30 from its lowered, inclined loading position to its raised gate position, tag ends 82 and 83 unwind relative to support 40 and become partially lengthened. The ability of tag ends 82 and 83 to reciprocate and move in their respective sleeves 90 and 91 accommodates the partial shortening and lengthening of tag ends 82 in response to movement of ramp between its raised gate position and its lowered, inclined loading position. Sleeves 90 and 91 are important in this regard, and also in keeping tag ends 82 and 83 fixed in their respective positions. In FIG. 8, the fragmented dotted outline of ramp 30 shows it as it would appear in its lowered, inclined loading position and the corresponding winding of tension spring 80.

Referring back to FIG. 3, six tension springs 80 are shown in the preferred embodiment, in which the forces or working stresses applied by tension springs 80 are substantially equal to one another. Tension springs 80 impart working stresses that together function to support a portion or all of the load of ramp 30 for making it easy to manipulate and move ramp 30 between its raised gate position and its lowered, inclined loading position without having to bear the full load of ramp 30. Tension springs 80 are constructed and arranged with an overall length H from outer coil 81' to outer coil 81", wire diameter d, and number N of active coils 81 for providing a predetermined defined amount of working stress. The amount of the load of ramp 30 desired to be taken up, and the number of tension springs 80 employed, whether one or more, determines for each tension spring the overall length H between the outermost coils, the wire diameter d, and the number N of active coils.

Figure 9:
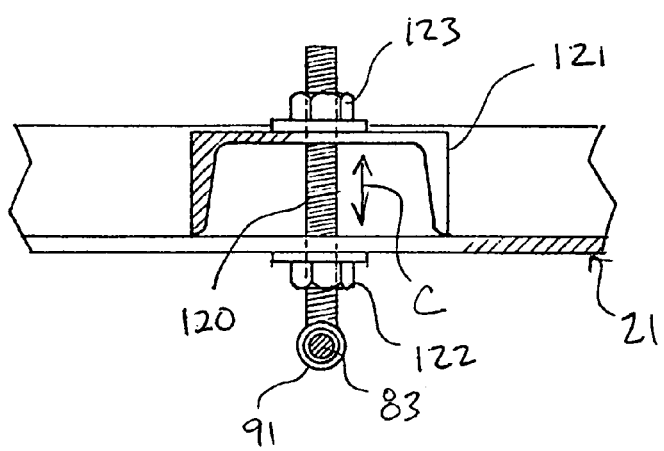
FIG. 9 is a sectional view taken along line 9-9 of FIG. 8.

Referring back to FIG. 8 and also to FIG. 9, an adjustment structure is illustrated that consist of an elongate threaded bolt 120 rigidly affixed to sleeve 91, such as by welding or the like. Threaded bolt 120 projects forwardly from sleeve 91 into and through a fixture 121 of body 21. Fixture 121 is basically part of the framework forming body 21, and is denoted only generally. A pair of nuts 122 and 123 is threaded onto bolt 120, each on either side of fixture 121. By selectively rotating nuts 122 and 123, bolt 120 is reciprocally adjustable or movable through fixture 121 in forward/upstream and rearward/downstream directions as indicated by the double arrowed line C for moving sleeve 91, and tag end 83 held therein, in a rearward/downstream direction away from body 21 unwinding tension spring 80 decreasing its working stress, and a forward/upstream direction toward body 21 winding tension spring 80 increasing its working stress. To adjust bolt 120, for instance, nut 122 is rotated to release it and move it away from fixture 121, nut 123 is rotated to correspondingly urge bolt 120 rearwardly or forwardly, and then when bolt 120 is in the desired position nut 122 is rotated and tightened against fixture 121 securing nuts 122 and 123 against fixture 121 and locking bolt 120 in place. Accordingly, the provision of the adjustability of tag end 83 in reciprocal directions in opposition to body 21 for unwinding and winding tension spring 80 is highly desirable for adjusting the working stress applied by tension spring 80, which may be required in some instances. It is to be understood that there is enough clearance between sleeve 91 and tag end 83 that relative reciprocal adjustment of tag end 83 in the manner herein described is permitted without binding or interference. Also, if desired a pivotal or articulating attachment between sleeve 91 and bolt 120 can be employed.

Preferably, each of the tension springs 80 incorporates the adjustment structure depicted in FIGS. 8 and 9, although less than all of tension springs 80 can be provided with it as desired, including only one of tension springs 80. For each of the tension springs 80 that do not incorporate the described adjustment structure, the sleeve 91 thereof may be rigidly affixed directly to body 21. Furthermore, although the described adjustment structure in FIGS. 8 and 9 is described in conjunction with sleeve 91, it may be incorporated in conjunction with sleeve 90 for adjusting sleeve 90, and tag end 82 held therein, in reciprocal directions in opposition to ramp 30 between a rearward/downstream direction away from ramp 30 winding tension spring 80 relative to support 40 increasing its working stress, and a forward/upstream direction toward ramp 30 unwinding tension spring 80 relative to support 40 decreasing its working stress. It will be understood that each tension spring 80, and the accompany structure associating it with trailer 20, may be considered a tension spring assembly.

In FIG. 5, ratchet assembly 100 is depicted which is provided to help ramp 30 stay in its lowered, inclined loading position and prevent it from being inadvertently dislodged therefrom, as previously intimated. Ratchet assembly 100 prevents pivotal movement of ramp 30 from its lowered, inclined loading position to its raised gate position, yet does not interfere with movement of ramp 30 from its raised gate position to its lowered, inclined loading position.

Ratchet assembly 100 consists of a pinion 101 and a pawl 102. Pinion 101 encircles, and is rigidly affixed to, support 40 at end 42 next to bracket 45. Pawl 102 is affixed to bracket 45, and interacts with pinion 101 preventing support 40 from rotating in the direction indicated by the arcuate arrowed line B in FIG. 2 thus preventing ramp 30 from moving from its lowered, inclined loading position to its raised gate position, while not inhibiting support 40 from rotating in the direction indicated by the arcuate arrowed line A in FIG. 2 and thus ramp 30 from moving from its raised gate position to its lowered, inclined loading position. Ratchet assembly 100 serves the important purpose of preventing ramp 30 from becoming dislodged from its lowered, inclined loading position during loading activities. As with a typical ratchet assembly, pawl 102 is pivotally attached to bracket 45 with a pivot pin 103, so that it may be moved between its working position interacting with pinion 101 and its non-working position free of pinion 102 for allowing support to rotate freely in the direction indicated by the arcuate arrowed line B in FIG. 2 for thus allowing ramp 30 to be moved from its lowered, inclined loading position to its raised gate position. Although ratchet assembly 100 is incorporated with end 42 of support 40 and bracket 45, it can be similarly incorporated with end 41 of support 40 and bracket 44, or located elsewhere so as to function in the manner as herein described. Also, although the invention incorporates only one ratchet assembly 100, more can be used if desired, such as one for end 41 of support 40 and one for end 42 of support.

Figure 11:
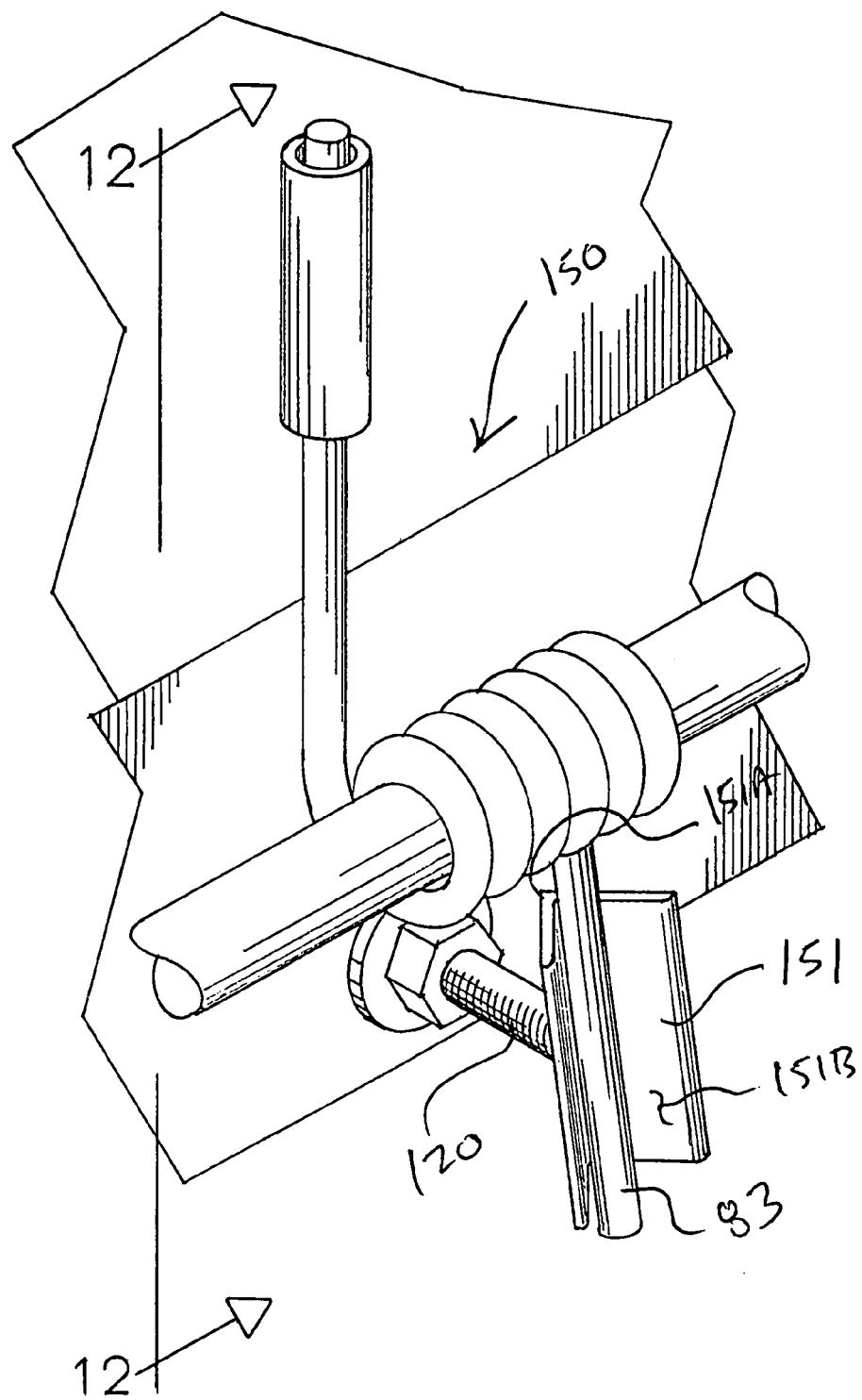
FIG. 11 is an enlarged isometric view of an alternate embodiment of a tension spring assembly constructed and arranged in accordance with the principle of the invention.
Figure 12:
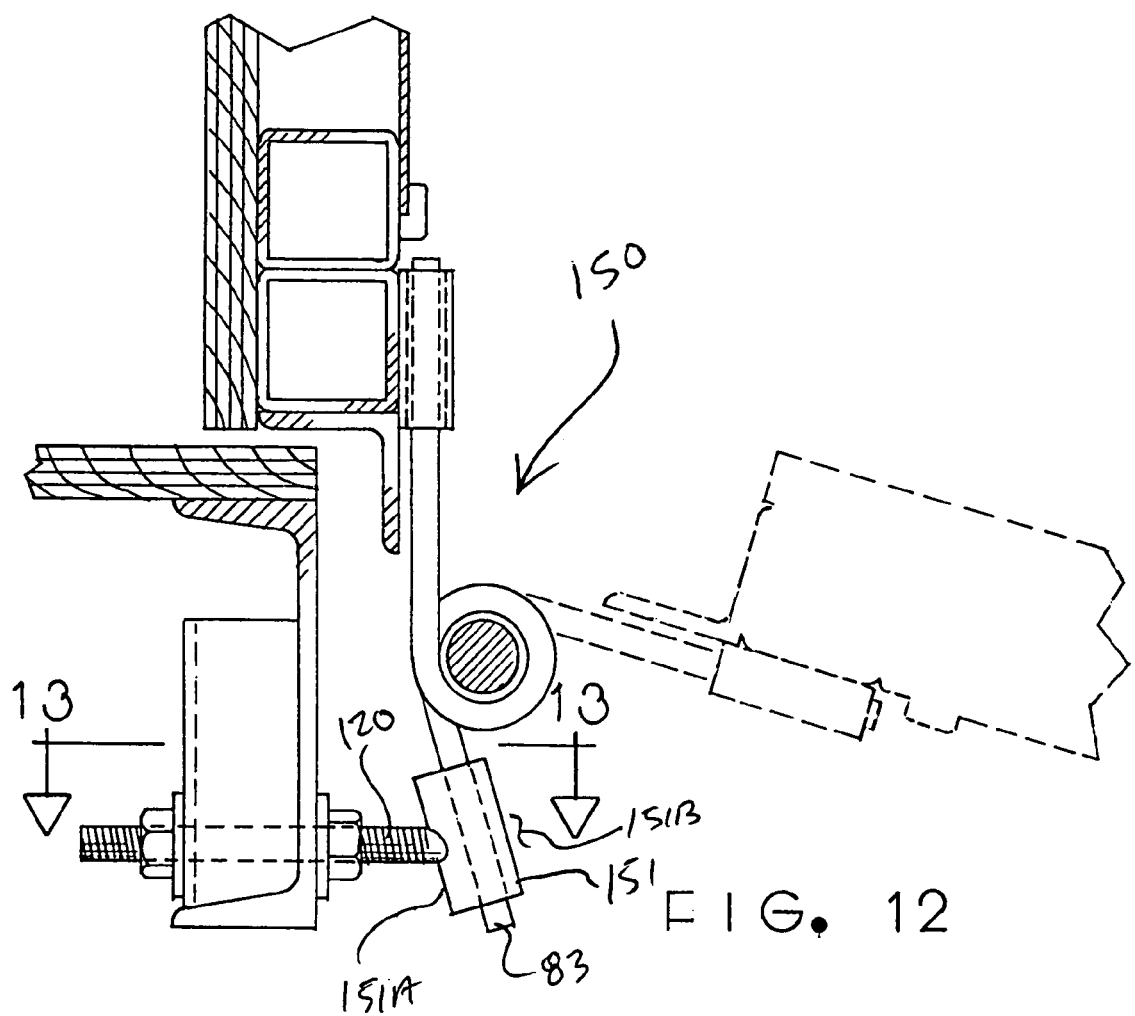
FIG. 12 is a sectional view taken along line 12-12 of FIG. 11.
Figure 13:
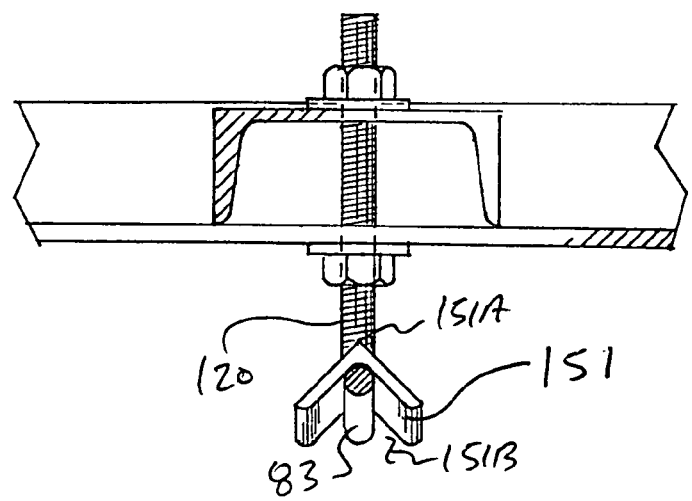
FIG. 13 is a sectional view taken along line 13-13 of FIG. 12.

The invention has been described above with reference to a preferred embodiment. However, those skilled in the art will recognize that changes and modifications may be made to the embodiment without departing from the nature and scope of the invention. For instance, reference is now made to FIG. 11 which illustrates an alternate embodiment of a tension spring assembly generally designated at 150. Tension spring assembly is identical in every respect to the tension spring assembly set forth in FIG. 10, with the exception that fixture coupling tag end 83 consists not of a sleeve 91 as with the embodiment set forth in FIG. 10 but rather an open, generally V-shaped seat 151 against which tag end 83 rests. Seat 151 has a closed end 151A attached to bolt 120, and an open end 151B, through which tag end 83 is received. Rather than a closed sleeve constituting the fixture as with sleeve 91, the embodiment in FIG. 11 is instructive of the use of an open seat 151 for a fixture, in which the associated advantage thereof is that provides for easier assembly and disassembly of the tension spring assembly. It is to be understood that tag end 83 reciprocates relative to seat 150 as tag end 83 is reciprocally adjusted in opposition to trailer 20. As a matter of disclosure, FIG. 12 is a sectional view taken along line 12-12 of FIG. 11, and FIG. 13 is a sectional view taken along line 13-13 of FIG. 12. As can be seen in FIGS. 12 and 13, seat 150 is angled somewhat rearwardly, which has the advantage of providing the best seating of tag end 83 into seat 150 with respect to the reciprocal adjustment of seat 150 by the adjustment structure associated therewith. Other than the provision of seat 150, the previous discussion of the tension spring assembly as shown in FIG. 10 and discussed in connection therewith and with the associated drawings applies to the tension spring assembly set forth in FIG. 11. If desired, sleeve 90 may be provided in the form of a seat like that of seat 150.

Various further changes and modifications will readily occur to those skilled in the art. To the extent that such modifications and variations do not depart from the spirit of the invention, they are intended to be included within the scope thereof.

Having fully described the invention in such clear and concise terms as to enable those skilled in the art to understand and practice the same, the invention claimed is:

The invention claimed is:

1. Apparatus comprising:
   a trailer;
   a ramp including an end attached to the trailer for pivotal movement of the ramp between a raised gate position and a lowered, inclined loading position;
   an elongate support attached to the wheeled body adjacent to the end of the ramp;
   a tension spring encircling the support and having a first tag end coupled to the end of the ramp and a second tag end coupled to the trailer and winding and unwinding in response to movement of ramp between its raised gate position and its lowered, inclined loading position, respectively;
   the first tag end disposed in a first fixture, for relative reciprocal movement, affixed to the end of the ramp;
   the second tag end disposed in a second fixture, for relative reciprocal movement, affixed to the trailer; and
   one of the first and second fixtures adjustable between a first position away from one of the trailer and the end of the ramp and a second position toward the one of the trailer and the end of the ramp.

2. In a trailer, and a ramp having an end attached to the trailer for pivotal movement of the ramp between a raised gate position and a lowered, inclined loading position, improvements therein comprising:
   an elongate support attached to the trailer adjacent to the end of the ramp;
   a tension spring encircling the support and having a first tag end coupled to the end of the ramp and a second tag end coupled to the trailer and winding and unwinding in response to movement of ramp between its raised gate position and its lowered, inclined loading position, respectively;
   the first tag end disposed in a first fixture, for relative reciprocal movement, affixed to the end of the ramp;
   the second tag end disposed in a second fixture, for relative reciprocal movement, affixed to the trailer; and
   one of the first and second fixtures is adjustable between a first position away from one of the trailer and the end of the ramp and a second position toward the one of the trailer and the end of the ramp.

3. Apparatus comprising:
   a trailer;
   a ramp including an end affixed to an elongate support attached to the trailer for rotation in a first direction corresponding to movement of the ramp from a raised gate position and a lowered, inclined loading position, and a second position corresponding to movement of the ramp from the lowered, inclined loading position to the raised gate position;
   a tension spring encircling the elongate support and having a first tag end coupled to the end of the ramp and a second tag end coupled to the trailer and winding and unwinding in response to movement of ramp between its raised gate position and its lowered, inclined loading position, respectively;
   a pinion encircling, and rigidly affixed to, the elongate support; and
   a pawl, affixed to the trailer, and movable between a first position interacting with the pinion preventing the elongate support from rotating in the second direction, and a second position free of the pinion permitting the elongate support to rotate in the second direction.

4. Apparatus according to claim 3, further comprising:
the first tag end disposed in a first fixture, for relative reciprocal movement, affixed to the end of the ramp; and
the second tag end disposed in a second fixture, for relative reciprocal movement, affixed to the trailer.

5. Apparatus according to claim 4, wherein one of the first and second fixtures is adjustable between a first position away from one of the trailer and the end of the ramp and a second position toward the one of the trailer and the end of the ramp.

6. In a trailer, and a ramp including an end affixed to an elongate support attached to the trailer for rotation in a first direction corresponding to movement of the ramp from a raised gate position and a lowered, inclined loading position, and a second position corresponding to movement of the ramp from the lowered, inclined loading position to the raised gate position, improvements therein comprising:
a tension spring encircling the elongate support and having a first tag end coupled to the end of the ramp and a second tag end coupled to the trailer and winding and unwinding in response to movement of ramp between its raised gate position and its lowered, inclined loading position, respectively;
a pinion encircling, and rigidly affixed to, the elongate support; and
a pawl, affixed to the trailer, and movable between a first position interacting with the pinion preventing the elongate support from rotating in the second direction, and a second position free of the pinion permitting the elongate support to rotate in the second direction.

7. The improvements according to claim 6, further comprising:
the first tag end disposed in a first fixture, for relative reciprocal movement, affixed to the end of the ramp; and
the second tag end disposed in a second fixture, for relative reciprocal movement, affixed to the trailer.

8. The improvements according to claim 7, wherein one of the first and second fixtures is adjustable between a first position away from one of the trailer and the end of the ramp and a second position toward the one of the trailer and the end of the ramp.

9. Apparatus comprising:
a trailer;
a ramp including an end attached to the trailer for pivotal movement of the ramp between a raised gate position and a lowered, inclined loading position;
an elongate support attached to the trailer adjacent to the end of the ramp;
a plurality of tension springs attached to the elongate support at spaced intervals;
each of the tension springs encircling the support and having a first tag end coupled to the end of the ramp and a second tag end coupled to the trailer and winding and unwinding in response to movement of ramp between its raised gate position and its lowered, inclined loading position;
the first tag ends each disposed in one of a plurality of first fixtures, for relative reciprocal movement, affixed to the end of the ramp;
the second tag ends each disposed in one of a plurality of second fixtures, for relative reciprocal movement, affixed to the trailer; and
one of the first fixtures and the second fixtures are each adjustable between a first position away from one of the trailer and the end of the ramp and a second position toward the one of the trailer and the end of the ramp.

10. In a trailer, and a ramp having an end attached to the trailer for pivotal movement of the ramp between a raised gate position and a lowered, inclined loading position, improvements therein comprising:
an elongate support attached to the trailer adjacent to the end of the ramp;
a plurality of tension springs attached to the elongate support at spaced intervals;
each of the tension springs encircling the support and having a first tag end coupled to the end of the ramp and a second tag end coupled to the trailer and winding and unwinding in response to movement of ramp between its raised gate position and its lowered, inclined loading position, respectively;
the first tag ends each disposed in one of a plurality of first fixtures, for relative reciprocal movement, affixed to the end of the ramp;
the second tag ends each disposed in one of a plurality of second fixtures, for relative reciprocal movement, affixed to the trailer; and
one of the first fixtures and the second fixtures are each adjustable between a first position away from one of the trailer and the end of the ramp and a second position toward the one of the trailer and the end of the ramp.

11. Apparatus comprising:
a trailer;
a ramp including an end affixed to an elongate support attached to the trailer for rotation in a first direction corresponding to movement of the ramp from a raised gate position and a lowered, inclined loading position, and a second position corresponding to movement of the ramp from the lowered, inclined loading position to the raised gate position;
a plurality of tension springs each encircling the support and having a first tag end coupled to the end of the ramp and a second tag end coupled to the trailer and winding and unwinding in response to movement of ramp between its raised gate position and its lowered, inclined loading position, respectively;
a pinion encircling, and rigidly affixed to, the elongate support; and
a pawl, affixed to the trailer, and movable between a first position interacting with the pinion preventing the elongate support from rotating in the second direction, and a second position free of the pinion permitting the elongate support to rotate in the second direction.

12. Apparatus according to claim 11, further comprising:
the first tag ends each disposed in one of a plurality of first fixtures, for relative reciprocal movement, affixed to the end of the ramp; and
the second tag ends each disposed in one of a plurality of second fixtures, for relative reciprocal movement, affixed to the trailer.

13. Apparatus according to claim 12, wherein one of the first fixtures and the second fixtures are each adjustable between a first position away from one of the trailer and the end of the ramp and a second position toward the one of the trailer and the end of the ramp.

14. In a trailer, and a ramp including an end affixed to an elongate support attached to the trailer for rotation in a first direction corresponding to movement of the ramp from a raised gate position and a lowered, inclined loading position, and a second position corresponding to movement of the ramp from the lowered, inclined loading position to the raised gate position, improvements therein comprising:

a plurality of tension springs each encircling the support and having a first tag end coupled to the end of the ramp and a second tag end coupled to the trailer and winding and unwinding in response to movement of ramp between its raised gate position and its lowered, inclined loading position, respectively;

a pinion encircling, and rigidly affixed to, the elongate support; and a pawl, affixed to the trailer, and movable between a first position interacting with the pinion preventing the elongate support from rotating in the second direction, and a second position free of the pinion permitting the elongate support to rotate in the second direction.

15. The improvements according to claim 14, further comprising:

the first tag ends each disposed in one of a plurality of first fixtures, for relative reciprocal movement, affixed to the end of the ramp; and the second tag ends each disposed in one of a plurality of second fixtures, for relative reciprocal movement, affixed to the trailer.

16. The improvements according to claim 15, wherein one of the first fixtures and the second fixtures are each adjustable between a first position away from one of the trailer and the end of the ramp and a second position toward the one of the trailer and the end of the ramp.

17. Apparatus comprising:

a trailer;

a ramp including an end attached to the trailer for pivotal movement of the ramp between a raised gate position and a lowered, inclined loading position;

an elongate support attached to the trailer adjacent to the end of the ramp;

a plurality of tension springs attached to the elongate support at spaced intervals;

each of the tension springs encircling the support and having a first tag end disposed a first fixture, for relative reciprocal movement, affixed to the end of the ramp, and a second tag end disposed in second fixture, for relative reciprocal movement, affixed to the trailer, and winding and unwinding in response to movement of ramp between its lowered and raised positions, respectively; and one of the first fixture and the second fixture is adjustable between a first position away from one of the trailer and the end of the ramp and a second position toward the one of the trailer and the end of the ramp.

18. In a trailer, and a ramp including an end attached to the trailer for pivotal movement of the ramp between a raised gate position and a lowered, inclined loading position, improvements therein comprising:

an elongate support attached to the trailer adjacent to the end of the ramp;

a plurality of tension springs attached to the elongate support at spaced intervals;

each of the tension springs encircling the support and having a first tag end disposed in a first fixture, for relative reciprocal movement, affixed to the end of the ramp, and a second tag end disposed in a second fixture, for relative reciprocal movement, affixed to the trailer, and winding and unwinding in response to movement of ramp between its raised gate position and its lowered, inclined loading position, respectively; and one of the first fixture and the second fixture is adjustable between a first position away from one of the trailer and the end of the ramp and a second position toward the one of the trailer and the end of the ramp.

19. Apparatus comprising:

a trailer;

a ramp including an end affixed to an elongate support attached to the trailer for rotation in a first direction corresponding to movement of the ramp from a raised gate position and a lowered, inclined loading position, and a second position corresponding to movement of the ramp from the lowered, inclined loading position to the raised gate position;

a plurality of tension springs each encircling the support and having a first tag end disposed in a first fixture, for relative reciprocal movement, affixed to the end of the ramp, and a second tag end disposed in a second fixture, for relative reciprocal movement, affixed to the trailer, and winding and unwinding in response to movement of ramp between its raised gate position and its lowered, inclined loading position, respectively;

a pinion encircling, and rigidly affixed to, the elongate support; and a pawl, affixed to the trailer, and movable between a first position interacting with the pinion preventing the elongate support from rotating in the second direction, and a second position free of the pinion permitting the elongate support to rotate in the second direction.

20. Apparatus according to claim 19, wherein one of the first fixture and the second fixture is adjustable between a first position away from one of the trailer and the end of the ramp and a second position toward the one of the trailer and the end of the ramp.

21. In a trailer, and a ramp including an end affixed to an elongate support attached to the trailer for rotation in a first direction corresponding to movement of the ramp from a raised gate position and a lowered, inclined loading position, and a second position corresponding to movement of the ramp from the lowered, inclined loading position to the raised gate position, improvements therein comprising:

a plurality of tension springs each encircling the support and having a first tag end disposed in a first fixture, for relative reciprocal movement, affixed to the end of the ramp, and a second tag end disposed in a second fixture, for relative reciprocal movement, affixed to the trailer, and winding and unwinding in response to movement of ramp between its raised gate position and its lowered, inclined loading position, respectively;

a pinion encircling, and rigidly affixed to, the elongate support; and a pawl, affixed to the trailer, and movable between a first position interacting with the pinion preventing the elongate support from rotating in the second direction, and a second position free of the pinion permitting the elongate support to rotate in the second direction.

22. The improvements according to claim 21, wherein one of the first fixture and the second fixture is adjustable between a first position away from one of the trailer and the end of the ramp and a second position toward the one of the trailer and the end of the ramp.

* * * * *